Patented Mar. 7, 1944 2,343,360

UNITED STATES PATENT OFFICE 2,343,360

PARASITICIDAL DUST FOR CONTACT USE AND PROCESS OF MAKING THE SAME

Robert B. Arnold, Stonewall Courts, Va., assignor to Tobacco By-Products and Chemical Corporation, Louisville, Ky., a corporation of Delaware No Drawing. Application June 12, 1941, Serial No. 397,737

8 Claims. (Cl. 167—33)

This invention relates to parasiticidal dusts for contact use and to processes of making the same, and particularly to such dusts as utilize the volatile insecticidal alkaloids nicotine, nornicotine or anabasine.

Such contact dusts heretofore employed for dusting plants which employ said alkaloids, have not had a sufficiently high and quick-acting lethal effect, so that too large a percentage of the insects attacked were not killed promptly, with the result that such insects, even though temporarily injured, were revived in time by mere access of air and rapidly increased to reinfest the plants, wherefore further dusting was required at too frequent intervals in order to keep the insects in check. This necessity for frequent dusting so increased the labor and cost of materials as to become uncommercial with many crops.

It is to be noted that merely providing a dust with a high concentration of nicotine or the like will not necessarily result in high lethal effect, unless such high concentration of nicotine is very quickly released by the carrier material when in contact with an insect. In other words, if the carrier material releases the nicotine only relatively slowly, the insect is not attacked by a sufficiently high concentration of nicotine to kill it, and, hence, will live until the nicotine has disappeared, thereafter being revived by the air. On the other hand, while the dust must release its volatile insecticide relatively easily when applied to a plant in order to be effective, such insecticide should not change its form or deteriorate during storage and transportation, or a rapid loss of lethal properties may result. It will be understood, of course, that a high concentration of nicotine, which, or a considerable portion of which, is chemically combined, is a poor contact material because its release of nicotine is either non-existent or at least at too slow a rate to be lethal.

With many of the dusts of the prior art, the distribution of such dusts was hampered by the fact that they were not free-flowing, that is to say, their particles had a tendency to cake, or at least cling together, which was a great disadvantage not only in distributing the dust on the plants, but also in manufacture, packaging, and storage of the dust.

Unfortunately, the freest-flowing dusts of the prior art are of high alkalinity, which adversely affects certain organic materials and also affects the pH constant of the sap of many kinds of plants to which such dusts are applied, thereby actually beneficially affecting some of the parasites on such plants so that, after the dusting, any such parasites still remaining on the plant will increase more rapidly than on plants having a less alkaline or neutral sap. For these reasons, the freest-flowing nicotine dusts of the prior art on account of their high alkalinity, have been disadvantageous, while the prior carriers which did not have such a high alkaline reaction were not sufficiently free-flowing to be satisfactory in manufacture and use.

A further disadvantage of many of the contact dusts of the prior art was that, on account of the presence of moisture, they were incompatible with other parasiticidal material, more particularly with sulphur-carrying fungicides. This led to an increase in the number of treatments of the plants, because such other material had to be applied separately from the nicotine or similar alkaloid contact dusts.

Also some of the contact dusts of the prior art employing the said alkaloids as insecticides were of such nature that the alkaloids were converted into hydrates either at once during manufacture, or with lapse of time, for example, during storage. Such hydrated alkaloids are not by any means as effective against sucking insects as are the free, unhydrated alkaloids.

While in the prior art various contact dusts were known, some of which would be free from some of the disadvantages above pointed out, others of which were free from other disadvantages, and so on, there was no contact dust known prior to the present invention which was free from all of the said disadvantages.

The object of the present invention is to provide a contact dust which will be free from the above-mentioned disadvantages of the contact dusts of the prior art.

Applicant has discovered that a contact dust comprising a carrier and an alkaloid selected from the group consisting of nicotine, nornicotine, anabasine, can be made and packaged so as to be both durable in storage and transportation, yet at the same time of high lethal effect, if the carrier material is derived from tobacco plant material and is at least recognizably alkaline, but never more alkaline than would be equivalent to two per cent sodium hydroxide figured on the weight of the said carrier material.

One method of determining the alkalinity of the alkalinized tobacco plant material is as follows:

Ten grams of the tobacco dust are placed in a volumetric flask having a capacity of at least 500 cc. To this is added 400 cc. of water. The flask is well shaken at intervals of about ten minutes over a period of about one hour. Then enough water is added to bring the total to exactly 500 cc., the flask well shaken and the contents filtered. From this filtrate 250 cc. are taken and titrated with standard acid solution, using litmus paper to determine the neutral point. From the amount of acid solution used to obtain neutrality and the known amount of sodium hydroxide necessary to produce neutrality of a given amount of said acid, it is possible to calculate the alkalinity of the treated tobacco plant material in terms of sodium hydroxide, as will be understood by those skilled in the art.

The contact parasiticidal dust of the present invention characterized as follows: It always carries a relatively high concentration of appreciably more than five per cent by weight of an insecticidal alkaloid such as nicotine, nornicotine, or anabasine, or a mixture of two or all of the same, said alkaloid being in its free state, and always substantially anhydrous during manufacture, transportation and storage, said alkaloid being so strongly held by adsorption or absorption that the dust is dispersable in the air or some other dust and yet so soon as dusted on a plant will quickly release its alkaloid and thereby give a sufficiently high concentration of alkaloid to rapidly destroy any insects in its immediate vicinity, or with which it is in contact. Furthermore, the characteristics of the dust are such that it may be manufactured, stored and shipped with its alkaloid in relatively high concentration, even up to twenty per cent, thus saving in manufacturing, packaging, storage and transportation costs, and yet at the place of use may be diluted with certain selected but readily obtainable cheap diluent material, or with certain other parasiticides, without appreciable loss of its alkaloid to the diluent material. Applicant has found that more nicotine will flow into an insect from one particle in contact with it and carrying a high concentration of an alkaloid such as nicotine, than would flow from a series of such particles in such contact even though carrying the same amount of nicotine, but at a low concentration. In other words, high concentration of the alkaloid rather than the same or even a larger quantity at low concentration determines the lethal effect.

The dust of the present invention is compatible with other parasiticides and particularly with sulphur-containing fungicides, so long as such added materials are not acid. Hence, such other materials may be mixed with the dust of the present invention and distributed simultaneously without weakening the lethal effect of the nicotine or similar alkaloid. This leads to a saving in time and labor as will be well understood by those skilled in the art, and therefore is an important feature of the new dust.

A further important feature of the invention is that while the new dust is never acid, its alkalinity is not higher than about two per cent as fixed alkali and as a consequence it cannot affect the pH value of the sap of the plant to which it is applied, to such an extent as to benefit any parasites, ready to attack the plant.

The lethal effect of the dust of the present invention is maintained during manufacture, storage and transportation largely because the alkaloid is substantially anhydrous and is associated with carrier material of such a nature that no appreciable hydration of the alkaloid can occur with lapse of time. It has been found that the said insecticidal alkaloids, and particularly nicotine, are susceptible to hydration and in such hydrated condition are by no means so lethal, when used as contact insecticides, as are the free, unhydrated alkaloids.

A further advantage of the dusts of the present invention is that they are very friable and, hence, non-caking and free-flowing, that is, they may be poured readily from one container to another and do not cake or agglomerate on standing. Therefore, when used, the dusts are very readily distributed in a finely dispersed condition. This free-flowing characteristic is also advantageous in that it promotes uniform flow from a dust hopper.

It was discovered that by the use of a very finely comminuted and graded carrier material made from specially treated tobacco as hereinafter more fully explained, a contact dust could be made which would have all the required characteristics hereinbefore indicated. It was found that the usual tobacco dust, which is either acid, or at best merely neutral, while it had many advantages as an absorbent material for nicotine, nornicotine, and anabasine, had the great disadvantage that it did not release the alkaloid rapidly when applied to plants and therefore had a lower lethal effect than was required for an effective rapid action. Also, it, in many cases, converted the alkaloid to a hydrate during long continued storage, and, in addition, was not always sufficiently free-flowing.

Applicant has discovered that if the usual tobacco plant material be alkalinized, that is to say, subjected to the action of an alkali, more particularly lime or ammonia, which ammonia may be generated from the plant material itself, as hereinafter explained, a product is obtained which may be dried thoroughly, finely ground and graded to provide a carrier material which will serve as an excellent absorber or adsorber or both for anhydrous nicotine, nornicotine, or anabasine, or a mixture of such materials, and while retaining the alkaloid in its non-hydrated condition, and in a concentration from over five per cent to as high as twenty per cent, during storage and transportation, will so quickly release the alkaloid when the dust is spread over the leaves of a plant, as in regular dusting operations, that a remarkably strong lethal effect is obtained.

The tobacco plant material may be of any kind, but for commercial reasons is usually low grade leaf, stems, factory sweepings or what may be termed generally waste tobacco. Such a material is at first comminuted in any suitable way, as by drying and chopping or rough grinding, so that most of the product will pass a six-mesh screen. The so comminuted product, small enough to pass through such a screen, is placed in a suitable container and to it is added an equal weight of milk of lime solution of about ten per cent strength and the whole is well mixed and either the mixing is continued for at least 15 minutes, or the mixture is "bulked," that is to say, is allowed to stand for about the same length of time until the liquid is fully absorbed by the tobacco plant material. In either case the resultant product is a uniformly moist material. This moist material may then be transferred to a drier or some other suitable closed apparatus which is capable of being heated to bring the tobacco material to a temperature slightly above the boiling point of water, for example to 220° F. The heating is continued long enough to complete the reactions which take place and to drive off substantially all the free water, thereby producing a substantially dry product, which at most should not contain more than three per cent moisture. During the heating some nicotine may be given off in the water vapors and this may be recovered therefrom. The dried material is finely ground so that most of it will pass a 200-mesh screen. After grading, as for example, by air separation or screening, the graded material is found to be profoundly altered both chemically and physically. The lime of the lime water has reacted with certain constituents of the original tobacco, the calcium being so chemically combined with such constituents that the final product although alkaline is not more than two per cent alkaline. Thus the resultant product is a finely ground slightly alkaline dry material which, while readily absorbing or adsorbing nicotine or like alkaloid and retaining it unchanged in storage, will quickly release the alkaloid when spread on a plant by the usual dusting methods. To this dry, finely ground carrier material there is added, in a suitable mixer, anhydrous nicotine or like alkaloid in sufficient quantity to constitute appreciably more than five per cent by weight of the completed material and in some cases up to twenty per cent thereof. For example, to make a nicotine dust concentrate of about ten per cent nicotine concentration, 10 pounds of 99 per cent anhydrous nicotine may be ground or mixed with 90 pounds of the dry processed tobacco material.

In general practice, anhydrous nicotine is employed, this being 98 to 99 per cent free nicotine, the balance of 2 per cent being mostly gummy or resinous impurities. Such nicotine must be substantially free from water, and may be obtained with as low as 0.3 per cent water as a commercial product. In no case, should it contain more than 1 per cent water. Such alkaloid is substantially free from any nicotine hydrate.

Where the carrier material has been dried to a point where it contains less than three per cent moisture, and where the alkaloid such as nicotine is substantially anhydrous and has not over one per cent moisture, the final dust product will be maintained substantially free from hydrated alkaloid, and because of the high concentration of such free alkaloid and the quick release of the same when applied, will have a lethal effect much higher than has heretofore been attained in contact dusts.

The completed dust is suitably packaged for storage and shipment, using substantially airtight metal containers such as friction top drums or cans, or, if the dust is to be stored longer than three months, hermetically sealed containers are desirable.

It will be understood that a contact dust made in accordance with applicant's invention, carrying as it does a relatively high concentration of the insecticidal alkaloid, such as nicotine or the like, is relatively expensive if applied directly as made to the plants to be treated. Also in this concentrated form much care is needed to distribute the concentrated dust uniformly because naturally it will be used in the smallest quantity necessary to accomplish the desired result. While, therefore, it can be and in some cases will be directly applied to the plants, it has the great advantage that it may be diluted by intimately commingling it with certain comminuted inert material, without materially weakening the concentration of the alkaloid on the prepared tobacco material, and the final product thus obtained may be distributed over, that is dusted on, plants with less labor and care than when using the concentrated dust itself. At the same time, the lethal effect is substantially that of the concentrated dust itself and is far stronger than that of the prior dusts in which the alkaloid was distributed substantially uniformly, but in weak concentration, over an equal amount of material.

In general practice it has been found that a dust carrying from six to eight per cent of anhydrous nicotine is entirely satisfactory for dilution with other material and application to plants, but there are many important advantages in charging the dust with nicotine above eight per cent, for example, to a concentration lying between ten and twenty per cent, and allowing the user to dilute this dust freely with other finely comminuted solid material inert to nicotine, which is lightly mixed with the nicotine dust before distributing it. Such mixing can be done readily by mere stirring or by putting the comminuted diluent solid material and the nicotine dust together in the hopper of the usual dust applying machine. The amount of diluent solid to be added is determined by the concentration of nicotine on the nicotine dust and is calculated so that the resultant mixture will figure as not less than one per cent nicotine in the final mixture, although it is to be kept in mind, that as the diluent comminuted material is inert to nicotine and in general takes up only a small part of the nicotine, the lethal effect of the dust is still substantially that of highly charged particles.

In this way the diluent material serves to aid in a better and more uniform distribution of the nicotine dust, and, at the same time, the lethal effect of the nicotine dust is not seriously reduced, because the particles of nicotine dust are still charged with substantially their high concentration of free insecticidal alkaloid such as nicotine. Of course, where the diluent material itself is a parasiticide, as, for example, an arsenical preparation for use against chewing insects, or a fungicide, such as neutral sulphur, a great advantage is obtained, because only one dusting operation is required instead of two. This is possible because the contact dust is compatible with many of the usual stomach poison insecticides and with many of the best fungicides, so that the particles of contact dust retain their high concentration of nicotine or substantially so notwithstanding admixture with the diluent material.

While the hereinbefore described process of treating the waste tobacco material is especially satisfactory, particularly because of rapidity and ready control of operations, an equally satisfactory and very similar carrier material may be made by employing a tobacco material which can be given a heavy sweating or fermentation, such as so-called cigar tobacco. Such a tobacco material is made quite moist, for example, up to forty per cent moisture, and then bulked, that is to say, piled in a large mass, in which condition it will in time undergo a heavy sweat or fermentation. This usually requires about three weeks, with turning every four or five days. At the end of this time there is a development of ammonia, from the decomposition of the organic nitrogen compounds contained in the original tobacco. This process and the action of the ammonia on other constituents of the tobacco gives a result similar to that of the lime in the first described process, so that the final product is again an alkalinized tobacco material in the sense in which that term is used here but with an alkalinity considerably below the two per cent limit, but always distinguishable from mere neutrality.

The resultant product of this ammonia alkalinizing process is then subjected to the same operations as was the lime-alkalinized tobacco product hereinbefore described, these operations including drying, grinding, grading to size, admixing with a sufficient amount of anhydrous nicotine, or similar alkaloid to give a concentration of more than five per cent by weight of alkaloid, and then packaging. In practice, with this carrier material, as with that first disclosed, the alkaloid concentration is satisfactory if between six and eight per cent, but there are many advantages in providing sufficient alkaloid to give a concentration of between ten and twenty per cent, the latter percentage being the advisable maximum since above that there may be difficulty in completely dispersing it in diluent materials, due to a slight adhesiveness of the particles.

The dusts of the present invention are intended to be transported and shipped in their highly concentrated condition, but, after arrival at the locality of use, may be diluted by the local dealer or by the user as circumstances may require, that is, by the addition of some comminuted material which is not a good adsorber of nicotine, and is anhydrous, such for example as talc, or clay. In general, however, the diluent material will itself have a useful function in assisting in protecting the plant, as for example, a substantially neutral stomach poison insecticide such as an arsenical composition, or a neutral fungicidal material, among the best of which is neutral sulphur in fine dust form.

Some examples of the final contact dust materials ready for application to plants are given below, these being intended as illustrative of the completed dusts of the invention but not as limiting such invention to the examples stated, it being understood that ingredients named in each example are to be mixed together thoroughly but lightly. In other words, grinding the ingredients together or any such strenuous mixing must be avoided.

*Example 1*

|  | Pounds |
|---|---|
| Ground dry processed tobacco material of the kind hereinbefore described charged with about 10 per cent anhydrous nicotine | 30 |
| Finely ground dry clay having no base exchange properties | 70 |
|  | 100 |

While the above figures as a three per cent nicotine dust, the lethal action is that of a nearly ten per cent nicotine dust.

*Example 2*

|  | Pounds |
|---|---|
| Ground dry processed tobacco material as in Example 1 | 30 |
| Dusting sulphur, neutral | 70 |
|  | 100 |

This figures as a three per cent nicotine dust and a seven per cent fungicidal dust, but the lethal action is that of a much stronger nicotine dust.

*Example 3*

|  | Pounds |
|---|---|
| Ground dry processed tobaco dust as in Example 1 | 30 |
| Dusting sulphur, neutral | 50 |
| Powdered lead arsenate | 20 |
|  | 100 |

This gives a dust which is a combination contact dust, stomach poison dust, and fungicidal dust, figuring as three per cent nicotine, but having the lethal effect of a higher per cent nicotine dust.

Where the diluent is to be mixed with the concentrated insecticidal dust in the dust-hopper of a dusting machine and immediately applied to the plants, finely comminuted hydrated lime may be used in some cases. It is an exceedingly free-flowing diluent and can be used where high alkalinity is not to be feared. It makes the mixed dust heavily alkaline and hence may affect the pH concentration of the plant sap. Hydrated lime has the further disadvantage that it will destroy or greatly reduce the insecticidal properties of certain materials, such as derris or pyrethrum which are at times used with the nicotine-carrying dust, and therefore should be used as a diluent with nicotine dusts only in special cases; for instance, when a copper fungicide is called for.

An example of a complete dust using hydrated lime is as follows:

|  | Pounds |
|---|---|
| Ground dry processed tobacco material of the kind hereinbefore disclosed charged with about 15 per cent anhydrous nicotine | 20 |
| Dry powdered hydrated lime | 50 |
| Dry powdered monohydrated copper sulphate | 10 |
| Calcium arsenate, dry | 20 |
|  | 100 |

The ingredients are mixed together and used immediately. The mixture figures as a three per cent nicotine dust, but on account of the nicotine remaining for the most part with its original carrier, it will have the lethal effect of a higher per cent nicotine dust. The above combination dust is an effective one-shot treatment for potatoes infested with sucking and chewing insects and fungus diseases.

What I claim is:

1. A contact dust parasiticidal material comprising a carrier consisting of finely pulverized alkalinized tobacco plant material substantially free from uncombined water, said carrier having a slight alkalinity but never exceeding that equivalent to 2 per cent sodium hydroxide, figured on the weight of the carrier, and a substantially anhydrous alkaloid selected from the group consisting of nicotine, nornicotine, anabasine, said alkaloid being carried in a free, chemically uncombined state by said plant material and constituting at least eight per cent and not substantially more than twenty per cent by weight of the combined weight of said carrier and alkaloid.

2. A contact dust parasiticidal material comprising a carrier consisting of finely pulverized alkalinized tobacco plant material substantially free from uncombined water, said carrier having a slight alkalinity but never exceeding that equivalent to 2 per cent sodium hydroxide, figured on the weight of the carrier, a substantially anhydrous alkaloid selected from the group consisting of nicotine, nornicotine, anabasine, said alkaloid being carried in a free, chemically uncombined state by said plant material and constituting at least eight per cent and not substantially more than twenty per cent by weight of the combined weight of said carrier and alkaloid, and a dry pulverized solid diluent material inert to the alkaloid, lightly commingled with the alkaloid-carrying carrier, and in such amount as to give not less than one per cent alkaloid in the final mixture.

3. A contact dust parasiticidal material comprising a carrier consisting of finely pulverized alkalinized tobacco plant material substantially free from uncombined water, said carrier having a slight alkalinity but never exceeding that equivalent to 2 per cent sodium hydroxide, figured on the weight of the carrier, a substantially anhydrous alkaloid selected from the group consisting of nicotine, nornicotine, anabasine, said alkaloid being carried in a free, chemically uncombined state by said plant material and constituting at least eight per cent and not substantially more than twenty per cent by weight of the combined weight of said carrier and alkaloid, and a dry pulverized, solid, parasiticidal material inert to the alkaloid, lightly commingled with the alkaloid-carrying carrier, and in an amount sufficient to give not less than one per cent alkaloid in the final mixture.

4. The process of making a parasiticidal dust carrying an insecticidal alkaloid selected from the group consisting of nicotine, nornicotine, anabasine, which comprises preparing a finely comminuted alkalinized tobacco plant material, containing not more than three per cent uncombined water, the alkalinity being not to exceed two per cent figured as sodium hydroxide, and mixing with it an anhydrous alkaloid of the class hereinbefore named in quantity sufficient to constitute at least eight per cent and not substantially more than twenty per cent of the weight of the treated tobacco material.

5. The process of making a parasiticidal dust carrying an insecticidal alkaloid selected from the group consisting of nicotine, nornicotine, anabasine, which comprises preparing a finely comminuted alkalinized tobacco plant material containing not more than three per cent uncombined water, the alkalinity being not to exceed two per cent figured as sodium hydroxide, mixing with it an anhydrous alkaloid of the class hereinbefore named in quantity sufficient to constitute at least eight per cent and not substantially more than twenty per cent of the weight of the tobacco material and thereafter intimately but lightly mixing the product with a powdered non-acid material inert to said alkaloid, the said inert material being added in such proportion that the alkaloid will figure not less than one per cent of the final mixture.

6. The process of making a parasiticidal dust carrying an insecticidal alkaloid selected from the group consisting of nicotine, nornicotine, anabasine, which comprises subjecting tobacco plant material to the action of an alkali selected from the group consisting of lime, ammonia, then heating the resultant product and drying it, until it contains not more than three per cent water, grinding it and grading it to form a powder, and mixing with it anhydrous alkaloid of the class hereinbefore named, said alkaloid having less than one per cent water, and being added in quantity sufficient to constitute more than five per cent and not substantially more than twenty per cent of the weight of the treated tobacco material.

7. The process of making a parasiticidal dust carrying an insecticidal alkaloid selected from the group consisting of nicotine, nornicotine, anabasine, which comprises comminuting tobacco plant material, mixing it with a ten per cent solution of lime-water, then heating the resultant product to complete all chemical reactions and drive off water until not more than three per cent remains, grinding and grading it to form a powder, and mixing said powder with anhydrous alkaloid of the class hereinbefore named, said alkaloid having less than one per cent water, and being added in quantity sufficient to constitute more than five per cent and not substantially more than twenty per cent of the weight of the treated tobacco material.

8. The process of making a parasiticidal dust carrying an insecticidal alkaloid selected from the group consisting of nicotine, nornicotine, anabasine, which comprises adding to a readily fermentable tobacco plant material moisture up to about forty per cent, piling the material in a mass and allowing it to ferment for a sufficient length of time to convert nitrogen product of the plant material to ammonia, then heating the resultant product until it contains not more than three per cent moisture, and is alkaline, grinding and grading the product to form a powder, and mixing it with an anhydrous alkaloid of the class hereinbefore named in sufficient quantity to constitute more than five per cent and not substantially more than twenty per cent of the weight of the treated tobacco material, said anhydrous alkaloid containing less than one per cent moisture.

ROBERT B. ARNOLD.